Jan. 1, 1963  J. C. BERNIER  3,070,894
AXONOMETRIC DRAFTING INSTRUMENT
Filed April 21, 1961  2 Sheets-Sheet 1

INVENTORS
Jean-Charles BERNIER
BY
ATTORNEYS

Jan. 1, 1963  J. C. BERNIER  3,070,894
AXONOMETRIC DRAFTING INSTRUMENT
Filed April 21, 1961  2 Sheets-Sheet 2
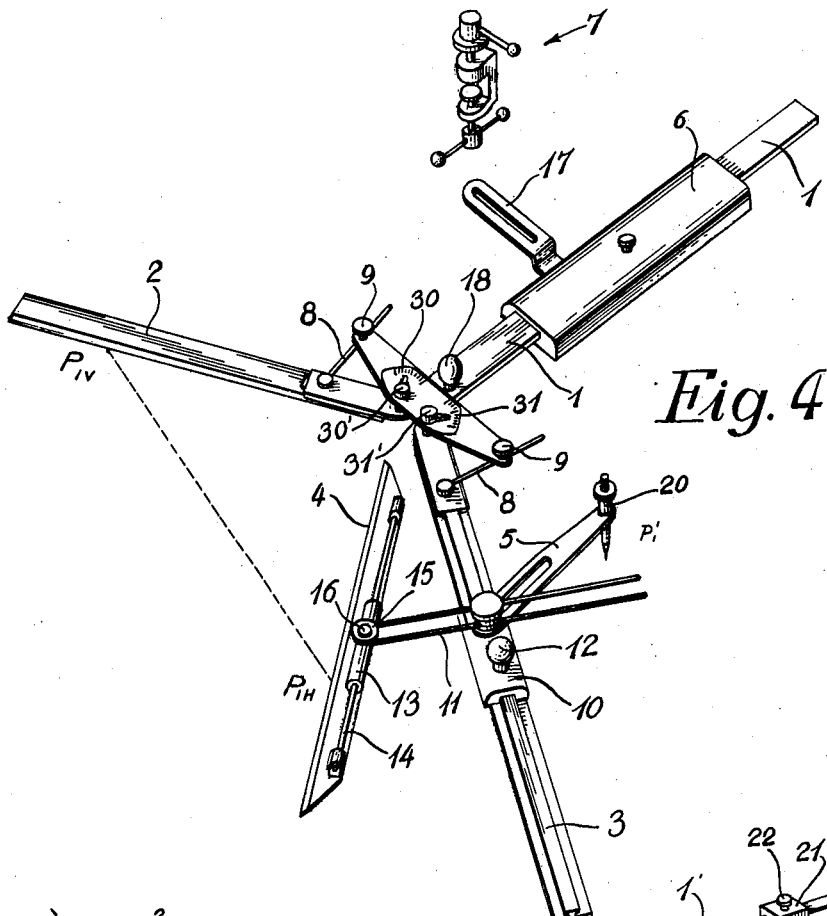
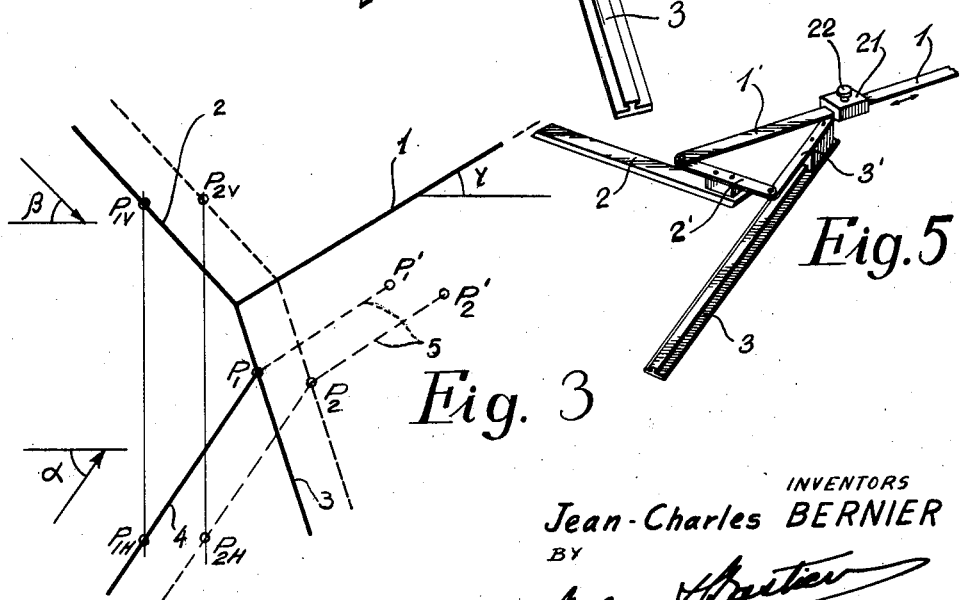
INVENTORS
Jean-Charles BERNIER
BY
ATTORNEYS

United States Patent Office 3,070,894
Patented Jan. 1, 1963

3,070,894
AXONOMETRIC DRAFTING INSTRUMENT
Jean Charles Bernier, 47 Glenco Ave.,
Montreal 8, Quebec, Canada
Filed Apr. 21, 1961, Ser. No. 104,562
6 Claims. (Cl. 33—189)

The present invention relates to mechanical drawing and more particularly to axonometric drawing by which an image of an object is produced by parallel projection of an object onto a selected plane.

Starting from the usual orthogonal plan and elevation views of an object it is possible to, graphically and by means of accessory instruments, produce axonometric views of the object.

However, it is a common drawback of all the previous methods and instruments known to the inventor that it is not possible to obtain the desired axonometric view without previously disturbing the normal respective orientations and positions of the various orthographic views used as starting points; such procedure is found most inconvenient for any of the following reasons:

(a) The original plan and elevation views must be cut or copies thereof must be produced.

(b) After the original or a copy thereof has been cut, the individual orthhographic views must be individually reoriented and positioned to meet the requirements of the instrument used, and of the viewpoint chosen. This procedure renders the identification of the corresponding points of each figure very difficult and time consuming.

(c) The proper orientation that must be given to the orthographic views is difficult to determine.

(d) The view points or directions of projection selected in respect of each of the orthographic views cannot readily be changed or altered without corresponding changes in the orientations of the orthographic figures.

(e) Most of the methods and instruments presently in use are convenient for the drawing of very specific axonometric projections such as for instance the isometric and the dimetric projections.

(f) The isometric and dimetric drawing systems are very often inappropriate because certain lines and details may remain either hidden or be in superposed coincidence.

The main object of this invention is to avoid any or all of the above mentioned drawbacks and inconveniences while at the same time permitting the obtention of the axonometric views that correspond to any desired sets of chosen viewpoints. Such results are obtained with the following advantages:

(a) The original plan and elevation drawings need not be cut nor rearranged on the drawing board, whatever be the chosen viewpoint.

(b) The viewpoints are easily visualized and consequently may be arbitrarily chosen and altered without difficulty in order to obtain the most advantageous axonometric view.

(c) The invention may be used without additional difficulties for the production of any axonometric projection without preference for particular cases such as isometric and dimetric projections.

(d) The invention renders possible the rapid production of any axonometric projections with no difficulty, a minimum of preparation and previous adjustments, and with great simplicity of operation.

Other objects and advantages of the invention will become apparent from the disclosure that follows. However, in order to fully describe this invention the geometrical and graphical concepts involved should be explained prior to describing the physical characteristics of the instrument proper.

In the drawings:

FIGURE 3 is a condensed form of FIGURE 2 wherein the details of geometrical construction have been eliminated and showing in heavy solid lines the essential components of the instrument which is the object of the present invention.

FIGURE 4 is a perspective view of an embodiment of the invention.

FIGURE 5 is a perspective view in part of a preferred embodiment of the invention.

Figure 1:
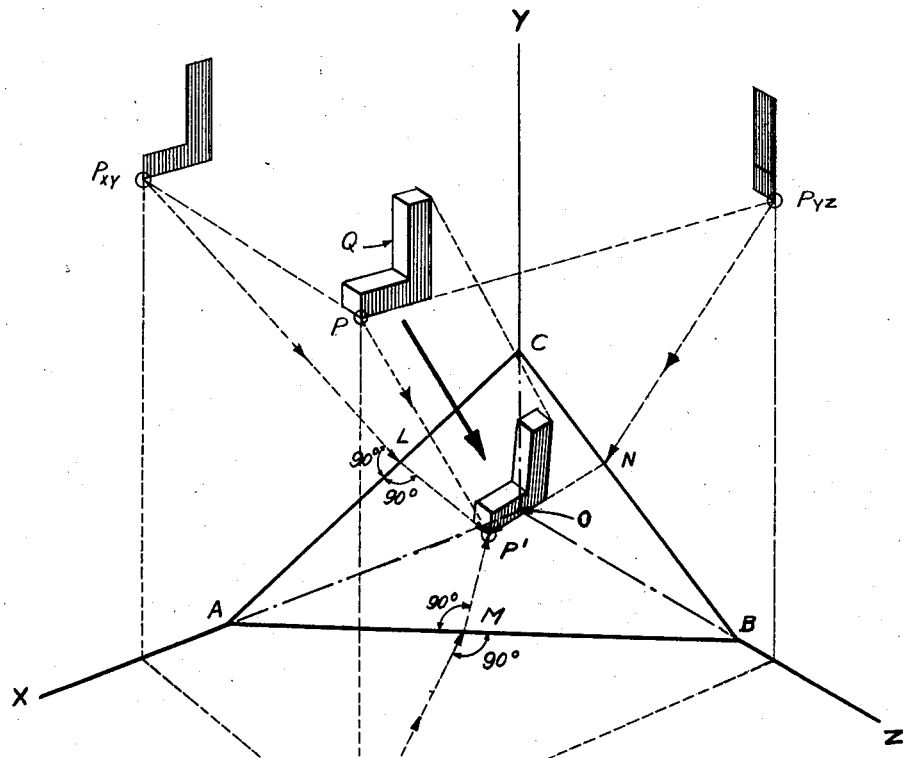
FIGURE 1 is a perspecive view, showing an object whose image is to be obtained by parallel projection perpendicularly to an inclined picture plane which intersects the three orthogonal planes.

From FIGURE 1, it is seen that the projected image P' of any point P is located at the intersection of lines such as LP', NP' and MP'. The lines $P_{xy}L$ and LP' are both perpendicular to AC respectively in the planes XACY and ACB.

From FIGURE 1, it may be defined and concluded that the desired axonometric picture is obtained by the parallel projection of the object Q perpendicularly to the picture plane ACB. One geometrical construction for arriving at this result is indicated above.

Figure 2:
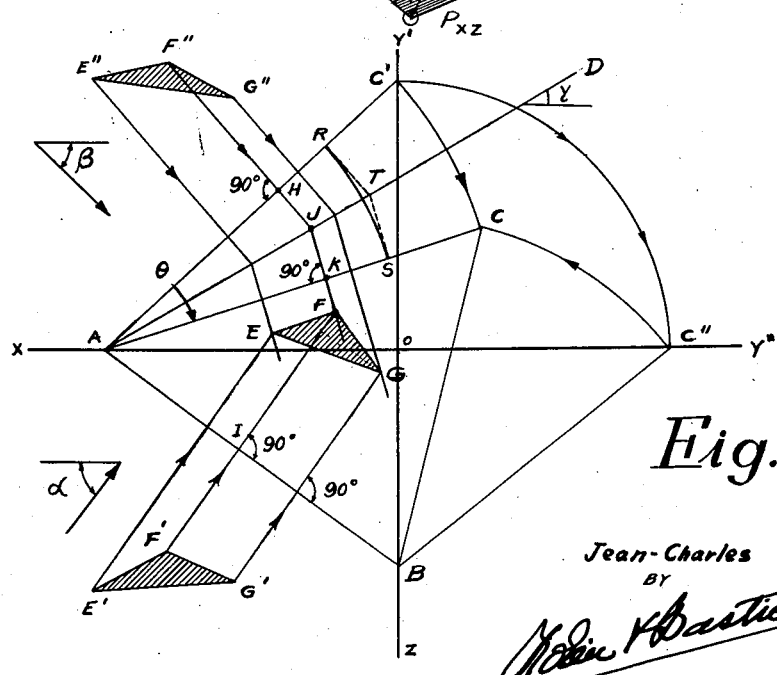
FIGURE 2 shows a preferred geometrical and graphical construction by which the desired projection may be conveniently performed; the graphical method of FIGURE 2 being the theoretical basis of the invention.

In FIGURE 2, the three orthogonal planes are represented by XOY', XOZ and Y"OZ respectively. The true size intercepts of the picture plane ABC with each of these orthogonal planes are AC', AB and BC" respectively; the lines OC' and OC" are equal.

Revolving the lines AC' and BC" about the points A and B respectively produces the triangle ABC which is a true size representation of the picture plane. Effectively this procedure amounts to revolving the picture plane ABC of FIGURE 1 about its ground plane intercept AB and onto the said ground plane.

In FIGURE 2 the object to be reproduced is by way of example a triangle, the plane of which is not parallel to any of the orthogonal planes; it is represented by its plan view E'F'G' and by its elevation E"F"G". Let us consider one point such as F and in particular its orthogonal projections F' and F" respectively.

Now, referring back to FIGURE 1, the polygon PP'MP$_{xz}$ is in a vertical plane through P and P$_{xz}$ perpendicular to the intercept AB. When as in FIGURE 2 the picture plane is revolved onto the ground plane, the broken line P$_{xz}$MP' of FIGURE 1 becomes a straight line such as F'IF. Similarly the line F"H of FIGURE 2 corresponds to P$_{xy}$L of FIGURE 1; now any point of AC' such as H and R can be located on AC at K and S by a rotation of an angle about A.

More conveniently, points such as K of FIG. 2 can be obtained by extending F"H to the bisectrix AD of the angle θ and from there projecting JK normally onto and beyond AC.

From points such as J or T on the bissectrix AD, lines such as JKF and TS are drawn perpendicular to AC, i.e. at an angle AJK equal to AJH.

Thus, point F is obtained from the intersection of F'I and JK. Other points of the picture such as E and G are similarly obtained.

The results of the previous theoretical discussion are outlined in FIGURE 3, wherein the points P$_1$ and P$_2$ can be obtained from the corresponding plan and elevation points P$_{1H}$, P$_{1V}$ and P$_{2H}$, P$_{2V}$ respectively through a very simple procedure by means of the invention.

Thus it is seen in FIGURE 3 that the invention essentially consists of two arms 2 and 3 corresponding to the projection lines F"J and JKF respectively of FIGURE 2, of an arm 1 corresponding to the bisectrix AD of FIGURE 2 and of an arm 4 corresponding to any of the lines E'E, F'F, or G'G of FIGURE 2.

The arm 4 can be locked in any chosen orientation corresponding to the direction of viewing chosen in respect to one of the orthogonal views; arm 4 is further slidably secured on the arm 3 and can be locked in any position therealong.

Previously to using the instrument for the solution of any particular problem of axonometric projection, the angular relationships between the arms 1, 2, 3 and 4 must be determined and set on the instrument. These angular adjustments depend only on the line of sight selected, which is itself specified by the angles $\alpha$ and $\beta$ of FIGURES 2 and 3 angle $\alpha$ is the angle between the trace XO and the orthogonal projection of the line of sight onto the ground plane XOZ; similarly angle $\beta$ is the angle between the trace XO and the orthogonal projection of the line of sight onto the elevation plane XOY' the above angles $\alpha$ and $\beta$ are readily chosen by the draftsman.

The angle $\gamma$ is then determined by the simple geometrical construction of FIGURE 2; it may also be computed with the following formula:

$$\gamma = \frac{1}{2}[\text{arc cos }(\sin \alpha \sin \beta)] + \alpha - \beta$$

For convenience, the inventor proposes to use tabulated and precalculated results. An example of such a table of values of $\gamma$ is given hereinafter; it gives the desired value of $\gamma$ for any combination of values of $\alpha$ and $\beta$ from 30° to 60° in 5° increments.

*Table 1.—Values of Angle ($\gamma$) in Degrees*

| $\beta$ \ $\alpha$ | 30.0 | 35.0 | 40.0 | 45.0 | 50.0 | 55.0 | 60.0 |
|---|---|---|---|---|---|---|---|
| 30.0 | 37.8 | 34.2 | 30.6 | 27.1 | 23.7 | 20.4 | 17.2 |
| 35.0 | 39.2 | 35.4 | 31.7 | 28.0 | 24.5 | 21.0 | 17.6 |
| 40.0 | 40.6 | 36.7 | 32.8 | 29.0 | 25.3 | 21.6 | 18.1 |
| 45.0 | 42.1 | 38.0 | 34.0 | 30.0 | 26.1 | 22.3 | 18.6 |
| 50.0 | 43.7 | 39.5 | 35.3 | 31.1 | 27.0 | 23.1 | 19.2 |
| 55.0 | 45.4 | 41.0 | 36.6 | 32.3 | 28.1 | 23.9 | 19.9 |
| 60.0 | 47.2 | 42.6 | 38.1 | 33.6 | 29.2 | 24.9 | 20.7 |

NOTE.—($\alpha$) in degrees, ($\beta$) in degrees.

Referring to FIGS. 3 and 4, a very convenient feature of the invention can be found in the provision of an arm 5 adjustably secured to the support of arm 4 and sliding therewith along arm 3. Through arm 5 the image which would normally be traced by the intersection $P_1$ of arms 3 and 4 is shifted or transferred to a more convenient location $P'_1$ without any distortion.

A better understanding of the invention as a whole, may be had, in reference to FIGURE 4. Effectively this figure shows a very simple embodiment of the invention. The reference numerals used in this and subsequent figures are identical to those used in connection with FIGURE 3.

The main arm 1 is slidably secured to a sleeve element 6 which in turn is adjustably secured to the drafting table by means of a clamp element 7. On the sleeve 6 there is provided a screw 19 the tightening of which locks the sliding motion of arm 1 therein. When securing the sleeve or guiding element 6 to the clamp 7 by means of slotted arm 17, the arm 1 can be given the desired orientation wherein it will be parallel to the bisectrix of the angle between arms 2 and 3, or, as expressed differently, an orientation such that it will be at an angle $\gamma$ with the orthogonal intercept XO. For greater ease in the manual handling of arm 1 a knob 18 is provided.

Terminally of the main arm 1 depend and are pivotally secured, the arms 2 and 3. The first reference arm 2 can by means of any suitable device such as rod 8 and clamp screw 9 be pivotally oriented parallel to the direction of viewing B chosen in connection with the uppermost of the two orthogonal views of which $P_{1V}$ is only a point.

The secondary arm 3 is pivotally secured to the main arm 1 in a similar fashion and is given an orientation such that the angle between it and the arm 1 is equal to that between arms 1 and 2. The arm 2 and 3 can be independently adjustable and for greater convenience angularly calibrated dials 30 and 31 can be provided terminally of arm 1, the needles 30' and 31' thereof being rigidly secured to the arms 2 and 3 respectively. It can also be foreseen without departure from the scope of the invention that the arms 2 and 3 be rendered simultaneously adjustable by any of a number of suitable means such as gears, cams etc. The secondary arm 3 is a track along which a rider 10 can be moved. From the rider 10 depend adjustable supporting arm 11 and tracer arm 5. Tightening of a knob 12 locks the rider 10 in any desired position along the arm 3.

Terminally of the supporting arm 11, and pivotally secured thereto, there is a sleeve 13 in which a rod 14 parallel to and depending from the second reference arm 4 is freely and longitudinally slidable. The arm 4 can be locked in an orientation corresponding to the direction of viewing $\alpha$ chosen in respect of the lowermost of the orthogonal views by tightening of a suitable screw 15 and similarly by the longitudinal sliding action of rod 14 in sleeve 13 can be locked by tightening of a screw 16.

In FIGURE 5 there is shown an alternative type of junction between the main arm 1 and the arms 2 and 3. Thus it is seen that by defining an isosceles triangle of which the base 1' is part of arm 1 and the two equal sides 2' and 3' are part of the arms 2 and 3, respectively it is possible to simultaneously adjust and orient the arms 2 and 3 while constantly maintaining the arm 1 parallel to the bisectrix of the angle between 2 and 3.

Because all joints between the arms of the mechanism of FIGURE 5 are pivotal and because one of the joints at the base of the triangle is slidable along arm 1 by means of a sleeve 21 and locking screw 22 it is possible simultaneously to give the desired orientations to the arms 2 and 3.

The preliminary adjustments which must be made are in the following order:

(a) Orientation of the main arm 1 at an angle $\gamma$ with the orthogonal intercept XO.

(b) Orientation of the first reference arm 2 at an angle $\beta$ with the orthogonal intercept XO.

(c) Orientation of the secondary arm 3 at an angle with arm 1, equal to the angle between arms 1 and 2.

(d) Positioning and orientation of arm 4 at an angle $\alpha$ with the orthogonal intercept XO.

(e) Positioning of the arm 5 and the marker 20 depending therefrom.

It can readily be appreciated that all the above adjustments must be made consecutively on the embodiment shown in FIGURE 4 whereas with the embodiment of FIGURE 5 the adjustments (b) and (c) are simultaneous, i.e. the adjustment (c) follows automatically from (b).

Once the preliminary adjustments have been made the procedure for tracing the desired axonometric view is very simple and rapid. A number of corresponding reference points such as $P_{1V}$ and $P_{1H}$ of FIGURE 4 are chosen and dealt with consecutively; the whole assembly is slid in sleeve 6 by means of the knob 18 until the edge of first reference arm 2 coincides with the point $P_{1V}$, the screw 19 may be tightened to lock the whole assembly in position, if desired. The rider 10 is then displaced along arm 3 until the edge of arm 4 coincides with the point $P_{1H}$ and locked in position by the knob 12. Having so located the point $P_{1V}$ and $P_{1H}$ the corresponding point $P'_1$ of the axonometric projection is then marked by actuating a marking device such as spring loaded pencil holder 20.

Any number of corresponding points chosen on the orthogonal views can thus be transposed to the axonometric view and be appropriately linked to complete the view.

For greater convenience and improved adaptability of the invention the arms 2 and 3 are preferably interchangeable, the slotted arm 17 can be shifted longitudinally to any position along sleeve 6 and to the other side thereof.

The embodiments shown constitute the simplest and best means of realization of the invention so far designed but can be greatly improved without departure from the scope of the appended claims.

What I claim is:

1. An instrument for the direct production of any axonometric view of an object from any given pair of orthogonal projections thereof, the said instrument comprising a first reference arm, a secondary arm, a second reference arm and marking means, the first reference arm being adjustable in parallel relationship with a line of viewing chosen in respect of one of the orthogonal views, the second reference arm being adjustable in parallel relationship with the line of viewing chosen in respect of the other of said orthogonal views, means for locking the said first and second reference arms in their respective parallel relationships with the chosen lines of viewing, means for longitudinally displacing the said first reference arm, secondary arm, second reference arm and marking means as a whole and in a preselected direction, the said second reference arm and marking means depending from a common carriage slidably secured to the secondary arm for longitudinal travel thereon, means for locking the said carriage at any desired position along the secondary arm, the said secondary arm being adjustable in such fashion that the said preselected direction becomes parallel to the bisectrix of the angle between it and the first reference arm.

2. An instrument as claimed in claim 1 wherein the means for longitudinally displacing the said first reference arm, secondary arm, second reference arm and marking means as a whole and in a preselected direction is a main arm freely slidable in a suitably oriented guiding device.

3. An instrument as claimed in claim 2 wherein the first reference arm, secondary arm and main arm are interconnected so as to form an isosceles triangle wherein the base is parallel to the main arm and the equal sides depend from the said first reference arm and secondary arm respectively and depend therefrom.

4. An instrument as claimed in claim 1 wherein the direction parallel to the bisectrix of the angle between the first reference arm and the secondary arm is a combined direct function of the directions of viewing chosen in respect of each of the two orthogonal views.

5. A drafting instrument for the direct production of any chosen axonometric projection from any given combination of at least two orthogonal plane views, said instrument being characterised in that it comprises means for fixation on a working surface, a longitudinally slidable and pivotally adjustable main arm depending from said fixation means, a primary reference arm pivotally secured on said main arm and adjustable to a position wherein it is parallel to the line of viewing chosen for one of the two orthogonal views, a secondary arm pivotally and adjustably secured to said main arm, a second reference arm adjustably and pivotally secured to said secondary arm, said second reference arm being slidable on said secondary arm and in a direction parallel to said secondary arm, and marking means depending from said second reference arm.

6. A drafting instrument for the production of axonometric views from any given pair of orthogonal views and comprising first and second reference arms said first reference arm being disposed parallel to the chosen direction of viewing corresponding to one of the orthographic views, said second reference arm being disposed parallel to the chosen direction of viewing corresponding to the other orthographic view, a secondary arm at an angle with said first reference arm, a main arm parallel to the bisectrix of the angle between said first reference arm and said secondary arm, said first reference arm and secondary arm being simultaneously displaceable in a direction parallel to said main arm, said second reference arm being slidable in a direction parallel to said secondary arm, marking means depending from said second reference arm.

No references cited.